(12) United States Patent
Ishii

(10) Patent No.: US 11,558,526 B2
(45) Date of Patent: Jan. 17, 2023

(54) IMAGE PROCESSING SERVICE SYSTEM

(71) Applicant: FUJIFILM BUSINESS INNOVATION CORP., Tokyo (JP)

(72) Inventor: Akihiro Ishii, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 403 days.

(21) Appl. No.: 16/656,817

(22) Filed: Oct. 18, 2019

(65) Prior Publication Data
US 2020/0344375 A1 Oct. 29, 2020

(30) Foreign Application Priority Data
Apr. 24, 2019 (JP) .............................. JP2019-082754

(51) Int. Cl.
| | | |
|---|---|---|
| H04N 1/00 | (2006.01) | |
| G06F 1/12 | (2006.01) | |
| H04N 1/34 | (2006.01) | |
| H04L 51/02 | (2022.01) | |
| G06F 3/12 | (2006.01) | |

(52) U.S. Cl.
CPC ....... *H04N 1/00925* (2013.01); *G06F 3/1204* (2013.01); *G06F 3/1205* (2013.01); *G06F 3/1206* (2013.01); *G06F 3/1292* (2013.01); *H04L 51/02* (2013.01); *H04N 1/00941* (2013.01); *H04N 1/344* (2013.01)

(58) Field of Classification Search
CPC combination set(s) only.
See application file for complete search history.

(56) References Cited

U.S. PATENT DOCUMENTS

| | | | |
|---|---|---|---|
| 2006/0177255 A1* | 8/2006 | Mizoi ................... | G06F 3/1204 400/62 |
| 2015/0153979 A1* | 6/2015 | Kogure ................. | G06F 3/1292 358/1.15 |
| 2018/0211246 A1 | 7/2018 | Sun et al. | |
| 2019/0369924 A1* | 12/2019 | Oka ........................ | H04L 51/02 |
| 2019/0377521 A1* | 12/2019 | Tokuchi ................ | G06F 3/1206 |
| 2019/0384545 A1* | 12/2019 | Dellagnolo ........... | G06F 3/1292 |

(Continued)

FOREIGN PATENT DOCUMENTS

| | | |
|---|---|---|
| JP | 2005-275515 A | 10/2005 |
| JP | 2018-118405 A | 8/2018 |

*Primary Examiner* — Helen Zong
(74) *Attorney, Agent, or Firm* — Oliff PLC

(57) ABSTRACT

An image processing service system includes an operation request accepting unit, a setting accepting unit, a payment control unit, and an operation execution control unit. The operation request accepting unit accepts an operation request for an image processing apparatus through a chat between a user and a chatbot participating in a chat service on a chat board provided by the service. The setting accepting unit accepts a setting for an operation of the image processing apparatus requested by the operation request. The payment control unit makes a payment for the operation of the image processing apparatus requested by the operation request through an electronic payment system available on the chat service. The operation execution control unit controls the image processing apparatus to execute the operation requested by the operation request after the setting is accepted by the setting accepting unit and the payment is made by the payment control unit.

8 Claims, 14 Drawing Sheets

(56) References Cited

U.S. PATENT DOCUMENTS

| | | | |
|---|---|---|---|
| 2020/0090150 A1* | 3/2020 | Chu | G06Q 30/0633 |
| 2020/0133597 A1* | 4/2020 | Ishida | G06F 3/1257 |
| 2021/0056521 A1* | 2/2021 | Sharma | G06F 40/30 |
| 2021/0224895 A1* | 7/2021 | Yamagishi | G06Q 20/4037 |
| 2022/0021786 A1* | 1/2022 | Tickler | G07F 17/266 |

* cited by examiner

IMAGE PROCESSING SERVICE SYSTEM

CROSS-REFERENCE TO RELATED APPLICATIONS

This application is based on and claims priority under 35 USC 119 from Japanese Patent Application No. 2019-082754 filed Apr. 24, 2019.

BACKGROUND

(i) Technical Field

The present disclosure relates to an image processing service system.

(ii) Related Art

Output services are provided in which a document file uploaded to a server on the Internet is transferred and output to an image processing apparatus under control of the server. Japanese Unexamined Patent Application Publication No. 2005-275515 discloses a system including a mobile terminal, a database server connected to the mobile terminal via the Internet, a print output machine (image processing apparatus) installed in any printing service store, and a printing service data server connected together with the print output machine. The printing service data server is connected to the database server via the Internet. In the system, the mobile terminal instructs the database server to transfer selected desired data for printout to the printing service data server to obtain a print reservation number, and then inputs the reservation number to the print output machine to output the selected desired data from the print output machine.

SUMMARY

To utilize the service described above, a user installs a dedicated application program into a terminal apparatus and makes user registration beforehand. In addition, the user logs in before executing an operation. Further, a billing device is installed together with an image processing apparatus to provide a service to general users for a fee.

Aspects of non-limiting embodiments of the present disclosure relate to an image processing service system that enables payment using no billing device without time-consuming operations such as installing a dedicated application program, making user registration to utilize a service, and logging in before executing an operation.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing service system including an operation request accepting unit, a setting accepting unit, a payment control unit, and an operation execution control unit. The operation request accepting unit accepts an operation request for an image processing apparatus through a chat between a user and a chatbot serving as a participant in a chat service on a chat board provided by the chat service. The setting accepting unit accepts a setting for an operation of the image processing apparatus requested by the operation request. The payment control unit makes a payment for the operation of the image processing apparatus requested by the operation request through an electronic payment system available on the chat service. The operation execution control unit controls the image processing apparatus to execute the operation requested by the operation request after the setting is accepted by the setting accepting unit and the payment is made by the payment control unit.

BRIEF DESCRIPTION OF THE DRAWINGS

An exemplary embodiment of the present disclosure will be described in detail based on the following figures, wherein.

DETAILED DESCRIPTION

The following describes an exemplary embodiment of the present disclosure in detail with reference to the accompanying drawings.

System Configuration

Figure 1:
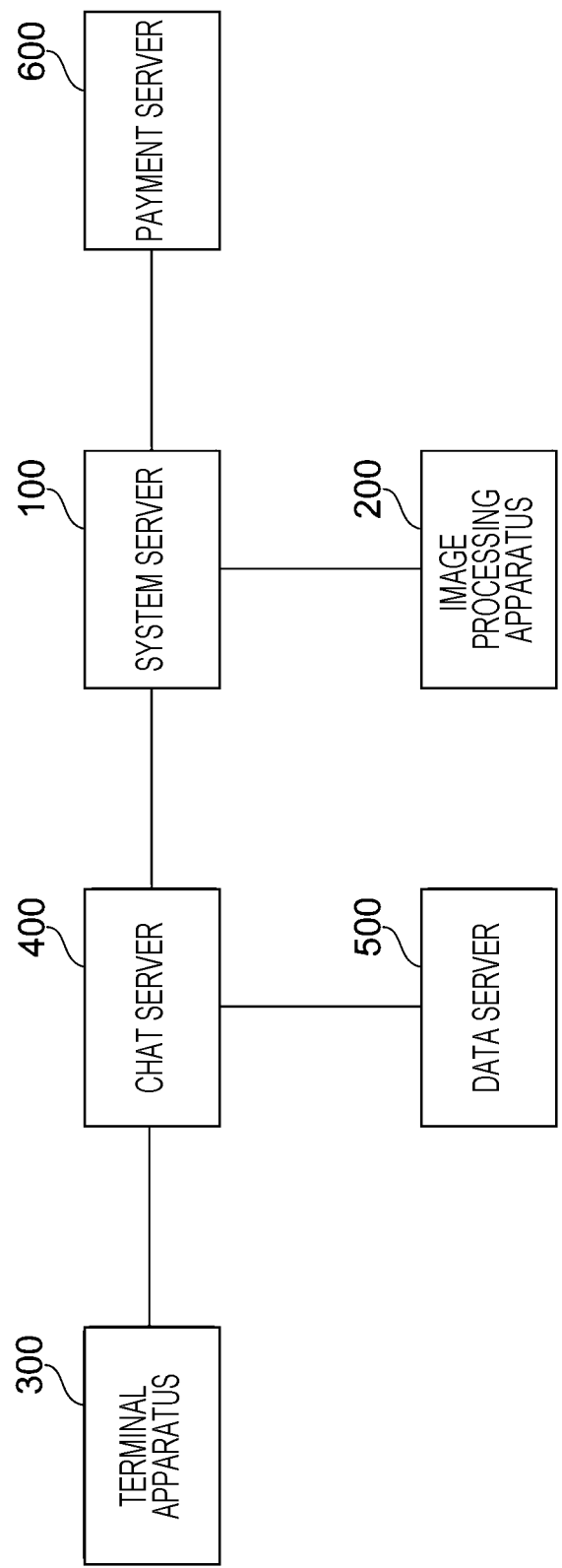
FIG. 1 illustrates an overall configuration of an image processing service system according to the exemplary embodiment.

FIG. 1 illustrates an overall configuration of an image processing service system according to this exemplary embodiment. The system according to this exemplary embodiment includes a system server 100, an image processing apparatus 200, a terminal apparatus 300, a chat server 400, a data server 500, and a payment server 600. The system server 100 is connected to the image processing apparatus 200, the chat server 400, and the payment server 600 via a network. The chat server 400 is also connected to the terminal apparatus 300 and the data server 500 via the network. Examples of the network include the Internet. The system may include a plurality of image processing apparatuses 200. The system may include a plurality of terminal apparatuses 300.

The system server 100 is a server that accepts an operation request output from the terminal apparatus 300 and that controls the image processing apparatus 200. The system server 100 accepts an operation request by using a chat service provided from the chat server 400 through a chat with the terminal apparatus 300. The chat may be achieved by exchanging messages.

The image processing apparatus 200 is an apparatus that executes an operation such as forming an image based on image data on a medium or reading an image on a medium. Examples of the medium include a sheet of paper. The image processing apparatus 200 receives the operation request output from the terminal apparatus 300 through the system server 100, and performs an operation requested by the operation request.

The terminal apparatus 300 is an apparatus that outputs an operation request for the image processing apparatus 200. A user operates the terminal apparatus 300 to chat with the system server 100 by using the chat service provided from the chat server 400 to request the image processing apparatus 200 to execute an operation. Examples of the terminal apparatus 300 include an information processing terminal such as a personal computer and a smartphone.

The chat server 400 is a server that provides a chat service. Specifically, the chat server 400 accepts a posted chat message and displays the accepted chat message on a chat board to make the chat message visible. The chat server 400 has a group function for configuring and managing groups in the chat service. Each of the groups is constituted by specific participants. In each group, only the group members, or participants, are allowed to post and view chat messages. The chat server 400 may be implemented by, for example, a service site such as an existing social networking service (SNS) site.

The data server 500 is a server used to implement a data transfer function in the chat service provided from the chat server 400. For example, when an instruction for designating a data file and transferring data is input on the chat board together with the posting of a chat message or separately from the posting of a chat message, the designated data file is sent to the data server 500 and stored in the data server 500.

The payment server 600 is a server that implements an electronic payment system available on the chat service provided from the chat server 400. The payment server 600 makes a payment for an operation executed by the image processing apparatus 200, and manages a payment result.

Configuration of System Server

Figure 2:
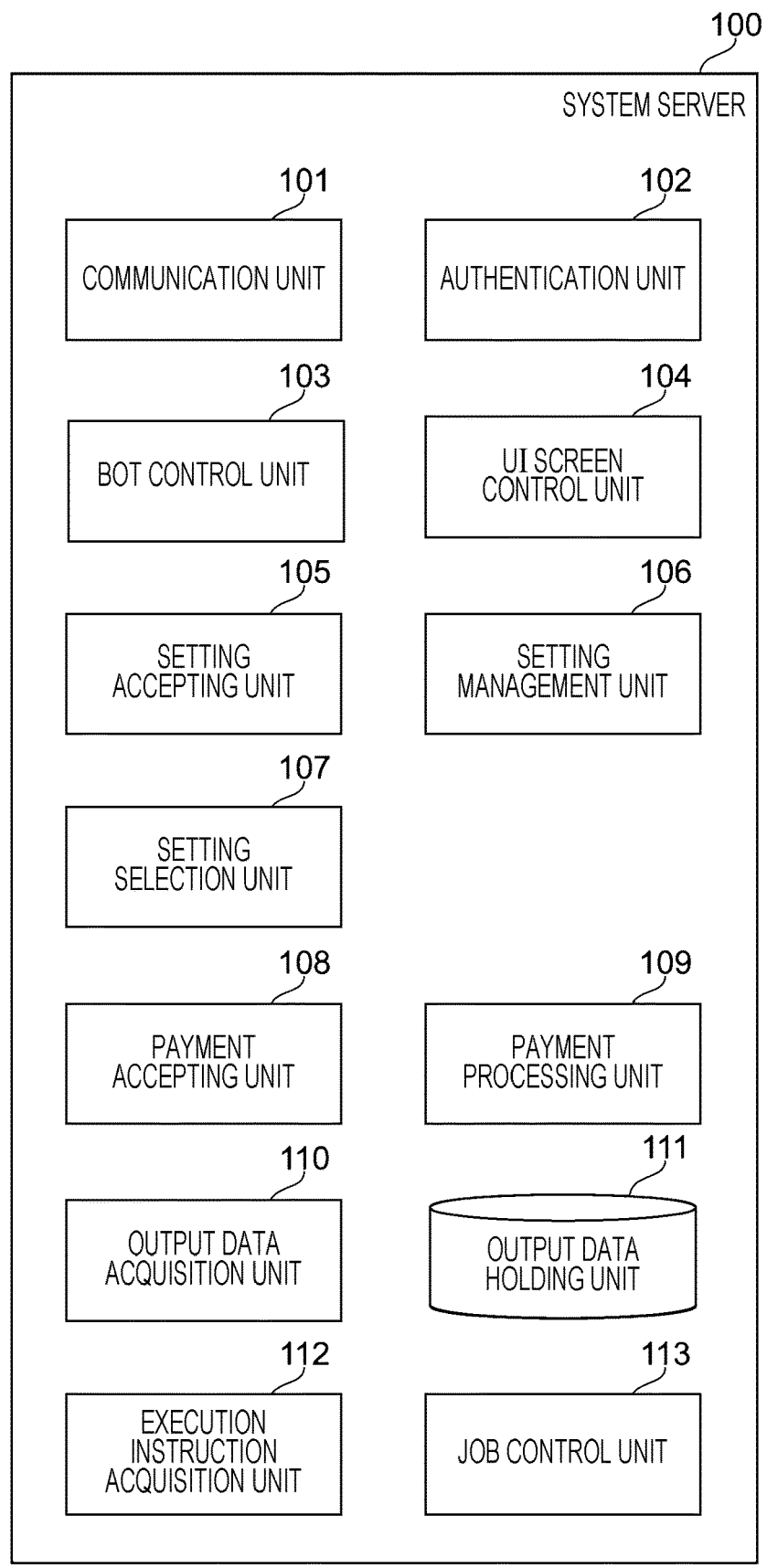
FIG. 2 illustrates a functional configuration of a system server.

FIG. 2 illustrates a functional configuration of the system server 100. The system server 100 includes a communication unit 101, an authentication unit 102, a bot control unit 103, and a user interface (UI) screen control unit 104. The system server 100 further includes a setting accepting unit 105, a setting management unit 106, and a setting selection unit 107. The system server 100 further includes a payment accepting unit 108 and a payment processing unit 109. The system server 100 further includes an output data acquisition unit 110, an output data holding unit 111, an execution instruction acquisition unit 112, and a job control unit 113.

The communication unit 101 is a network interface connected to an external apparatus, such as the image processing apparatus 200, the terminal apparatus 300, or the chat server 400, via a network to exchange data. In the communication unit 101, any means may be used to connect to the network, and either a wired or wireless communication line may be used.

The authentication unit 102 authenticates the terminal apparatus 300 using authentication information of the terminal apparatus 300 received from the communication unit 101. Through the authentication operation, it is determined whether the user of the terminal apparatus 300 is allowed to chat with the system server 100 in the chat service provided from the chat server 400.

The bot control unit 103 controls a bot function that allows a bot to communicate with other entities in the chat service provided by the chat server 400 in a human-like manner. The bot control unit 103 prepares a bot for each image processing apparatus 200 controlled by the system server 100. The bot control unit 103 manages combinations of a user and a bot corresponding to a particular image processing apparatus 200. The bot control unit 103 uses the group function of the chat service to configure a dedicated group where only a particular bot and a particular user can participate. This allows the system server 100 to accept an operation request for an image processing apparatus 200 from a user through the chat system and identify which user is requesting which image processing apparatus 200 to perform the operation.

The bot control unit 103 makes a conversation with a user participating in the chat service by generating and posting a message or interprets a message posted by the user. The bot control unit 103 accepts an operation request for the image processing apparatus 200 or an operation setting through a conversation with a user participating in the chat service. Furthermore, the bot control unit 103 presents various types of information to the user and guides the user during an operation. As described in detail below, the bot control unit 103 presents a command for switching the display screen to a setting screen or a payment screen to the user through a chat. The bot control unit 103 further presents the details of the operation setting or the amount of charge for the operation executed by the image processing apparatus 200 to the user through a chat. Thus, the bot control unit 103 is an example of a command presenting unit, an example of a setting presenting unit, and an example of a charge presenting unit.

The UI screen control unit 104 generates an operation screen for accepting an operation performed by the user, and sends the operation screen to the terminal apparatus 300. Specifically, the UI screen control unit 104 generates a setting screen that accepts a setting operation for performing setting on the image processing apparatus 200, a payment screen that accepts a payment operation for making a payment for an operation performed by the image processing apparatus 200, and any other screen. The UI screen control unit 104 is an example of a screen generation unit.

The setting accepting unit 105 accepts a setting input to the terminal apparatus 300 by the user. Examples of the setting include settings related to printing, such as the sheet size, enlargement/reduction, color density, simplex/duplex, the number of pages per sheet (N-up), and the number of copies. The user inputs a setting on the setting screen, which is generated by the UI screen control unit 104 and displayed on the terminal apparatus 300. The setting screen is transmitted by the bot control unit 103 to the terminal apparatus 300 through the setting accepting unit 105 in accordance with a request from the terminal apparatus 300 (i.e., the user). The UI screen control unit 104 and the setting accepting unit 105 are examples of a setting accepting unit.

The setting management unit 106 manages the setting accepted by the setting accepting unit 105. The setting managed by the setting management unit 106 is used to perform setting on the image processing apparatus 200 when the image processing apparatus 200 executes an operation.

The setting selection unit 107 accepts conditions regarding the settings for the operation or the amount of charge, and selects an operation setting executable under the accepted conditions. For example, the setting selection unit 107 accepts conditions, such as the size and number of sheets to be output from the image processing apparatus 200, and the amount of charge for the operation executed by the image processing apparatus 200, and selects and identifies candidate settings necessary to execute an operation that meets the conditions. If there is a plurality of settings with which the operation is executable under the requested conditions, candidate settings that cover all of the settings may be selected and identified, or candidate settings that cover only a specific setting in accordance with a predetermined condition may be selected and identified. Alternatively, the plurality of settings with which the operation is executable under the requested conditions may be assigned priority in accordance with a predetermined condition. In this case, as described below, when candidate settings selected by the setting selection unit 107 are presented to the user, the candidate settings may be presented in order based on the priority or the candidate settings may be recommended to the user based on the priority. The setting selection unit 107 is an example of a setting selection unit.

The payment accepting unit 108 accepts payment information input to the terminal apparatus 300 by the user. The payment information is information used to make an electronic payment of the charge for the operation executed by the image processing apparatus 200. The payment information is input by the user on the payment screen, which is generated by the UI screen control unit 104 and displayed on the terminal apparatus 300.

The payment processing unit 109 transmits the payment information accepted by the payment accepting unit 108 to the payment server 600, and receives a result of the payment operation executed by the payment server 600 (hereinafter referred to as "payment result") from the payment server 600. The UI screen control unit 104, the payment accepting unit 108, and the payment processing unit 109 are examples of a payment control unit.

The output data acquisition unit 110 acquires target data on which the operation of the image processing apparatus 200 is to be performed. The target data is acquired by using, for example, a data transfer function available on the chat service provided from the chat server 400. The output data acquisition unit 110 is an example of a data acquisition unit.

The output data holding unit 111 temporarily holds the acquired target data. The held data is transmitted to the image processing apparatus 200 when the image processing apparatus 200 executes an operation.

The execution instruction acquisition unit 112 acquires an execution instruction for instructing the image processing apparatus 200 to execute an operation. The execution instruction is acquired through a chat using the chat service of the chat server 400. Specifically, the bot control unit 103 posts a chat message for promoting the execution of an operation, displays the chat message on the chat board, and receives a reply to the chat message. Upon receipt of a chat message indicating the execution of an operation, the bot control unit 103 sends a notification indicating acceptance of the execution instruction to the execution instruction acquisition unit 112. The bot control unit 103 and the execution instruction acquisition unit 112 are examples of an operation request accepting unit.

The job control unit 113 controls the image processing apparatus 200 to execute an operation using the operation setting managed by the setting management unit 106 in accordance with the execution instruction acquired by the execution instruction acquisition unit 112. The job control unit 113 is an example of an operation execution control unit.

The system server 100 having the configuration described above is implemented by a server configured on the network, for example. The system server 100 may be implemented by a single server machine, or may be implemented by a plurality of servers such that the functions of the system server 100 are distributed to the plurality of servers. The system server 100 may provide a service as a so-called cloud service. The system server 100 includes an arithmetic means, namely, a central processing unit (CPU), and storage means, namely, a main storage device (main memory) and an external storage device. The CPU loads a program stored in the external storage device into the main storage device and executes the program. Examples of the main storage device include a random access memory (RAM). Examples of the external storage device include a magnetic disk drive, and a solid state drive (SSD). The CPU executes the program to implement the functions of the system server 100 described above.

Configuration of Image Processing Apparatus

Figure 3:
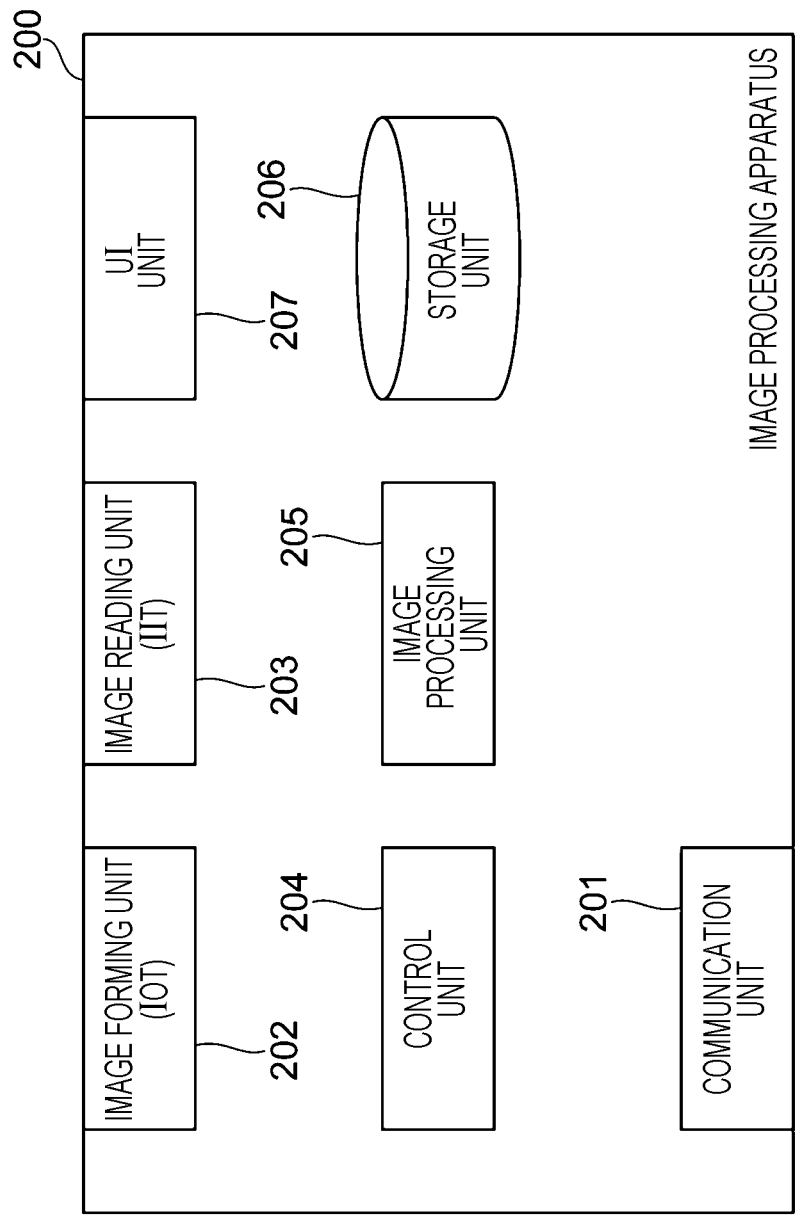
FIG. 3 illustrates a configuration of an image processing apparatus.

FIG. 3 illustrates a configuration of the image processing apparatus 200. The image processing apparatus 200 includes a communication unit 201, an image forming unit 202, an image reading unit 203, a control unit 204, an image processing unit 205, a storage unit 206, and a UI unit 207.

The communication unit 201 is a network interface connected to the system server 100 via a network to exchange data. In the communication unit 201, any means may be used to connect to the network, and either a wired or wireless communication line may be used.

The image forming unit 202 is an image output terminal (IOT). The image forming unit 202 is implemented by a printer, and forms an image based on image data on a sheet, which is an example of a recording material, by using an image forming material. The image may be formed on the recording material by using, for example, the electrophotographic system for forming an image on a recording material by transferring toner from a photoconductor onto the recording material, the inkjet system for forming an image on a recording material by ejecting ink onto the recording material, or any other suitable technology.

The image reading unit 203 is an image input terminal (IIT). The image reading unit 203, which is constituted by a scanner, optically reads an image on a document placed thereon and generates a read image (image data). The image may be read by using, for example, charge coupled device (CCD) or contact image sensor (CIS) technology. In CCD technology, light reflected from a document irradiated with light from a light source is reduced by the use of a lens and received by a CCD sensor. In CIS technology, light reflected from a document irradiated with light from a light emitting diode (LED) light source is received by a CIS sensor.

The control unit 204 controls the operation of the image processing apparatus 200. Specifically, the control unit 204 controls operations, for example, communicating with an external apparatus using the communication unit 201, executing an operation using the image forming unit 202 or the image reading unit 203, presenting information to the user, and accepting an operation performed by the user using the UI unit 207. The control unit 204 includes an arithmetic means, namely, a CPU, and a storage means, namely, a main storage device. The CPU loads a program into the main storage device and executes the program. The CPU executes the program to execute the various control operations described above.

The image processing unit 205 executes image processing, such as color correction or gradation correction, on an image to be processed in the operation executed by the image forming unit 202 or the image reading unit 203.

The storage unit 206 stores various data and programs. Specifically, the storage unit 206 stores data of an image or the like to be processed, history data of operations of the image forming unit 202 and the image reading unit 203, a program for controlling the operation of the image processing apparatus 200, and so on. Examples of the storage unit 206 include a magnetic disk drive and a non-volatile storage means such as an SSD.

The UI unit 207 includes a display means for displaying a screen such as an operation screen or an information presenting screen, and an input means used by an operator to perform an input operation. Through an input operation using the input means in accordance with the operation screen displayed on the display means, various control commands and control data are input. Examples of the display means include a liquid crystal display. Examples of the input means include hardware keys and a touch sensor. By way of example, the UI unit 207 may be implemented using a touch panel having a combination of a liquid crystal display, which is the display means, and a touch sensor, which is the input means.

Configuration of Terminal Apparatus

Figure 4:
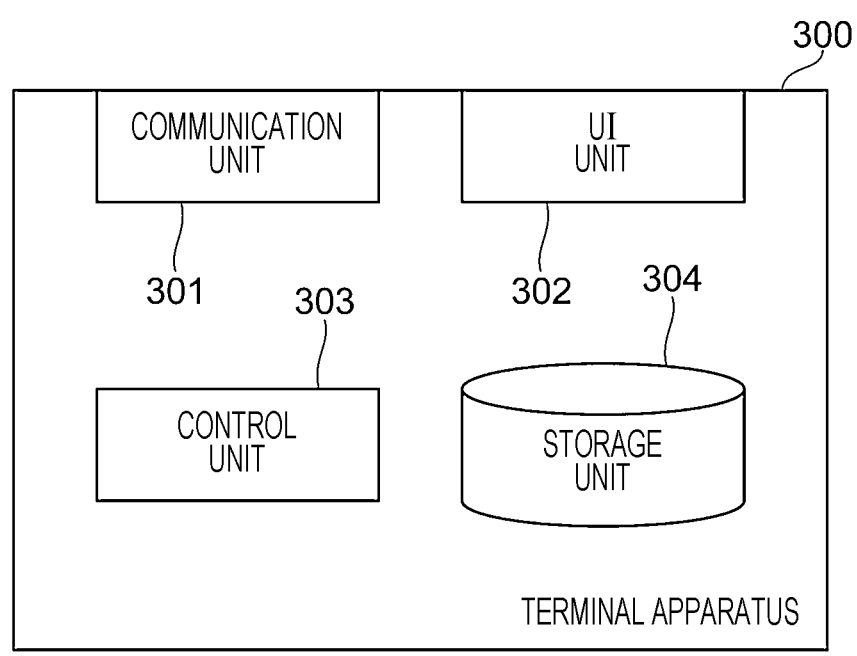
FIG. 4 illustrates a configuration of a terminal apparatus.

FIG. 4 illustrates a configuration of the terminal apparatus 300. The terminal apparatus 300 includes a communication unit 301, a UI unit 302, a control unit 303, and a storage unit 304.

The communication unit 301 is a network interface connected to the chat server 400 or the system server 100 via a network to exchange data. In the communication unit 301, any means may be used to connect to the network, and either a wired or wireless communication line may be used.

The UI unit 302 includes a display means for displaying a screen such as an operation screen or an information presenting screen, and an input means used by an operator to perform an input operation. Through an input operation using the input means in accordance with the operation screen displayed on the display means, various control commands and control data are input. Examples of the display means include a liquid crystal display. Examples of the input means include hardware keys and a touch sensor. By way of example, the UI unit 302 may be implemented using a touch panel having a combination of a liquid crystal display, which is the display means, and a touch sensor, which is the input means.

The control unit 303 controls the operation of the terminal apparatus 300. The control unit 303 includes an arithmetic means, namely, a CPU, and a storage means, namely, a main storage device. The CPU loads a program into the main storage device and executes the program. The CPU executes the program to execute various operations of the terminal apparatus 300.

The storage unit 304 stores various data and programs. Specifically, the storage unit 304 stores data of an image or the like to be processed in an operation executed by the image processing apparatus 200, a program for controlling the operation of the terminal apparatus 300, and so on. Examples of the storage unit 304 include a magnetic disk drive and a non-volatile storage means such as an SSD.

Acceptance of Operation Request through Chat

The system server 100 accepts an operation request for the image processing apparatus 200 on an interactive interface using the chat service provided from the chat server 400. Specifically, the system server 100 participates in the chat service by using a bot controlled by the bot control unit 103. The system server 100 accepts an operation request through an interaction between the bot and a user participating in the chat service using the terminal apparatus 300. The bot is configured for each image processing apparatus 200 controlled by the system server 100. Further, the system server 100 configures a group constituted by a bot corresponding to an image processing apparatus 200 and a user by using the group function of the chat service, and accepts an operation request through a chat within the group.

Figure 5:
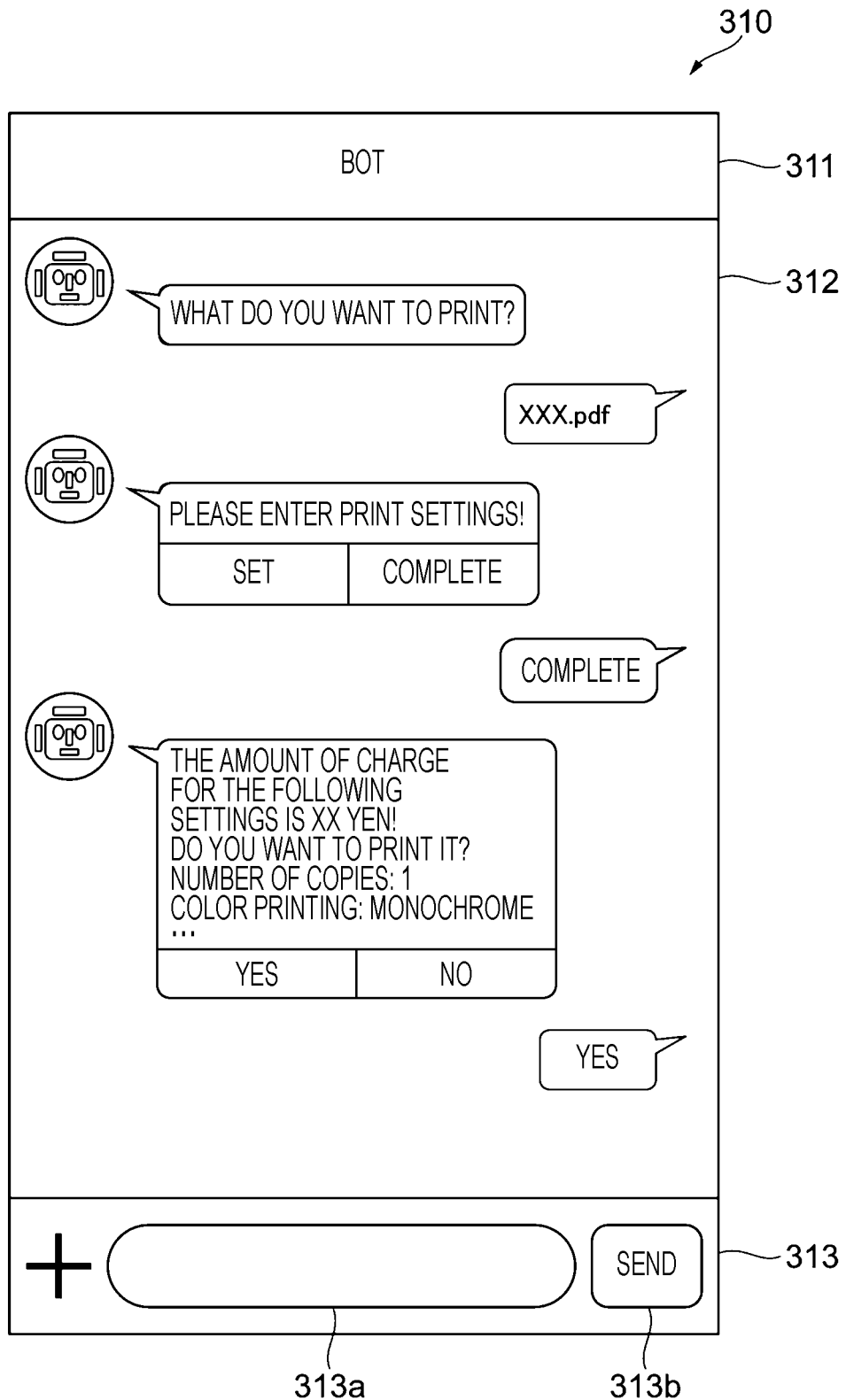
FIG. 5 illustrates an example of a chat board.

FIG. 5 illustrates an example of a chat board displayed on the UI unit 302 of the terminal apparatus 300. A chat board 310 contains a group field 311, a conversation display field 312, and an operation field 313. The group field 311 shows the name of a group (labeled "BOT" in the illustrated example) whose members are a bot and a user. The conversation display field 312 shows interactions between the bot and the user. The operation field 313 is a field that accepts an operation of posting a chat message by the user. In the operation field 313, a text box 313a and a Send button 313b appear. The text box 313a is an input field for inputting a chat message. The Send button 313b is a button object for transmitting a chat message input to the text box 313a to the chat server 400.

Referring to the conversation display field 312 in FIG. 5, example conversations between the bot and the user are illustrated. Chat messages in balloons from an icon in the left part of the conversation display field 312 are provided by the bot, and chat messages in balloons appearing in the right part of the conversation display field 312 are provided by the user. When a chat board for a group constituted by the bot and the user is displayed and a chat session is made active, an interactive interface of the bot is activated.

When the interactive interface of the bot is activated, the bot control unit 103 first enters an operation start phase. Then, the bot control unit 103 displays the chat message "What do you want to print?" to prompt the user to identify the target data. In the illustrated example, the user provides the reply chat message "XXX.pdf", which indicates a file name, to identify the data file to be printed. It is assumed here that the system server 100 has already acquired information on the storage location of the data file. By way of example, the system server 100 may inform the user of a storage device (e.g., the data server 500) used as a storage location of the target data in a previous chat session, and prompt the user to upload the target data. Alternatively, the target data may be read from an external document server or the like. In this case, the reply chat message from the user may include information designating a storage location, such as Uniform Resource Locator (URL), and information identifying a data file.

Then, the bot control unit 103 enters a setting phase. Then, the bot control unit 103 displays the chat message "Please enter print settings!" to prompt the user to input print settings. The chat message contains reply options. The user selects one of "set" and "complete" options as a reply. The "set" option is a command for invoking a setting screen generated by the UI screen control unit 104 of the system server 100 and displaying the setting screen on the UI unit 302 of the terminal apparatus 300. When "set" is input as a reply, the bot control unit 103 of the system server 100 notifies the setting accepting unit 105 of a request for the setting screen. Then, the setting accepting unit 105 transmits the setting screen generated by the UI screen control unit 104 to the terminal apparatus 300 and displays the setting screen on the UI unit 302.

The "complete" option is a command for finishing the setting operation. When "complete" is input as a reply, the bot control unit 103 of the system server 100 notifies the setting accepting unit 105 of a request for termination of the setting operation. The setting accepting unit 105 causes the setting management unit 106 to manage the accepted settings, and then the setting operation ends. If no setting is set on the setting screen, the setting management unit 106 manages the settings obtained before the bot control unit 103 enters the setting phase. In this case, the settings set immediately before entering the setting phase may be saved as the settings, or initial settings may be used. Which of the previous settings or the initial settings to employ may be determined based on the purposes or the like of the system.

When the setting operation is finished in accordance with the reply chat message "complete", then, the bot control unit 103 enters an execution instruction accepting phase. Then, the bot control unit 103 displays the chat message "The amount of charge for the following settings is XX yen! Do you want to print it?", presents the amount of charge, and waits for an instruction to be input to execute an operation. The chat message contains the content of the current settings. The user is able to check the amount of charge and the content of the settings and to determine whether to make an instruction to execute an operation.

The chat message also contains reply options. The user selects one of "yes" and "no" options as a reply. The "yes" option is a command provided when the user approves the presented amount of charge and the presented content of the settings and causes the image processing apparatus 200 to execute an operation. When "yes" is input as a reply, the bot control unit 103 of the system server 100 provides an instruction for executing an operation to the execution instruction acquisition unit 112. Then, the execution instruction acquisition unit 112 causes the job control unit 113 to control the image processing apparatus 200 to execute an operation. In this case, the target data identified in the operation start phase is sent to the image processing apparatus 200, and the image processing apparatus 200 executes an operation on the target data. The target data may be received by the system server 100, and the system server 100 may transfer the target data to the image processing apparatus 200. Alternatively, the target data may be transferred directly to the image processing apparatus 200 by using the data transfer function of the chat service. If the target data has been uploaded to an external apparatus such as the data server 500, the external apparatus may transfer the target data directly to the image processing apparatus 200.

The "no" option is a command for stopping the execution of an operation by the image processing apparatus 200. When "no" is input as a reply, the bot control unit 103 of the system server 100 enters a reset phase. The reset phase involves not only accepting a setting input by the user but also proposing a setting selected by the system server 100.

The specific phrases in the chat messages displayed by the bot in the chat session on the interactive interface described above with reference to FIG. 5 are not limited to the phrases described above (the phrases illustrated in FIG. 5). Each chat message may prompt the user to input information or perform an operation necessary for each operation phase, or request the user to check information. In addition, phrases presented as reply options in the setting phase or the execution instruction accepting phase may indicate the requirements for the corresponding operation phase, and are not limited to the phrases described above (the phrases illustrated in FIG. 5). For example, the "set" option may be any option indicating that a transition to the setting operation will occur, and may be "display the setting screen" or the like. The "complete" option may be any option indicating that the setting operation will be terminated, and may be "OK" or the like. The "yes" option may be any option indicating that an instruction will be given to execute a printing operation, and may be "print", "execute", or the like. The "no" option may be any option indicating that printing will be stopped and setting will be performed again, and may be "stop", "reset", or the like.

Figure 6:
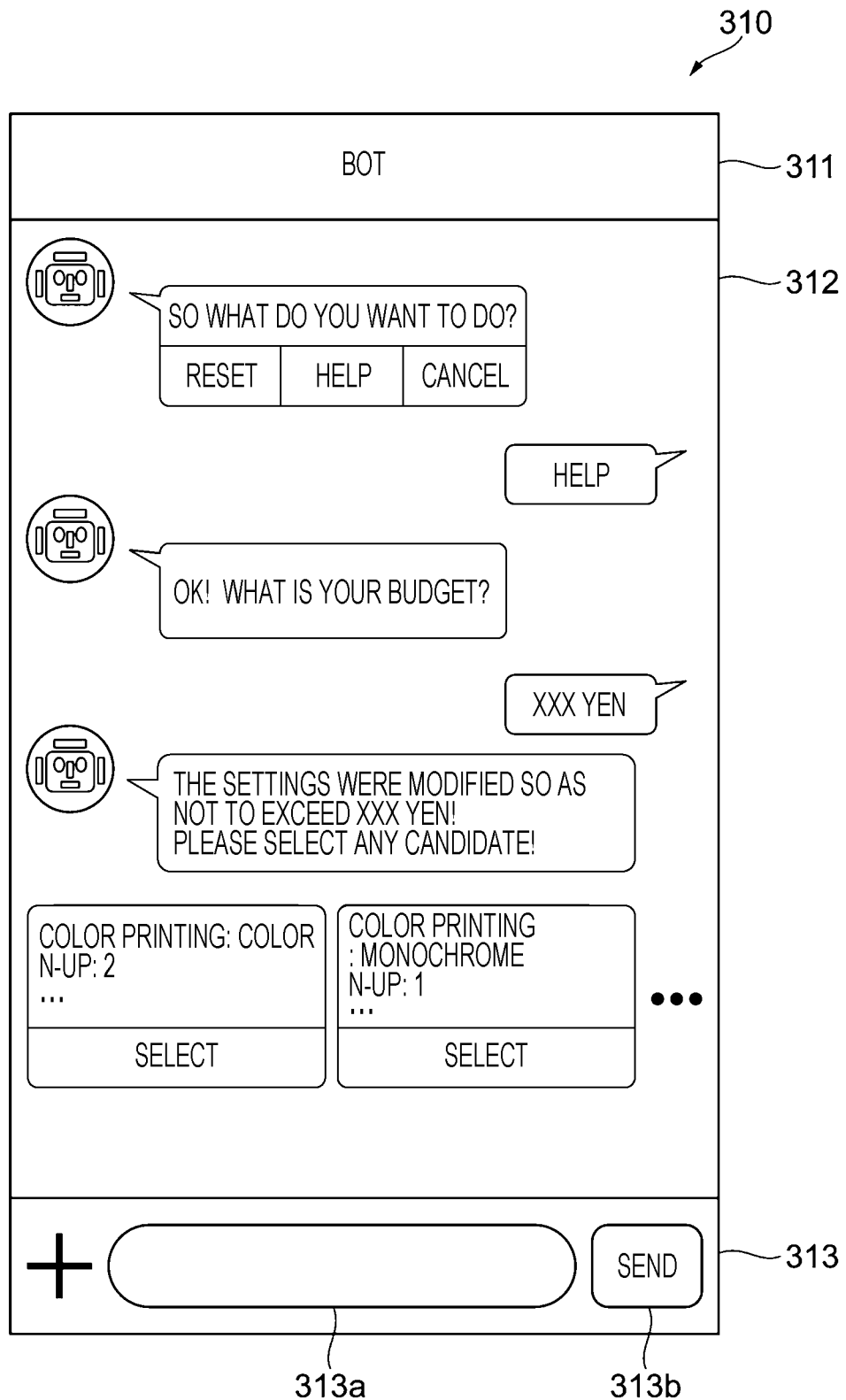
FIG. 6 illustrates another example of the chat board.

FIG. 6 illustrates another example of the chat board displayed on the UI unit 302 of the terminal apparatus 300. A chat board 310 illustrated in FIG. 6 indicates a display example of operations in the reset phase and the subsequent phases. In the reset phase, the bot control unit 103 displays the chat message "So what do you want to do?" to prompt the user to give an instruction, and contains reply options. The user selects one of "reset", "help", and "cancel" options. Like the "set" option illustrated in FIG. 5, the "reset" option is a command for invoking the setting screen and displaying the setting screen on the UI unit 302 of the terminal apparatus 300. When "reset" is input as a reply, the bot control unit 103 of the system server 100 notifies the setting accepting unit 105 of a request for the setting screen. Then, the setting accepting unit 105 transmits the setting screen generated by the UI screen control unit 104 to the terminal apparatus 300 and displays the setting screen on the UI unit 302.

The "help" option is a command for causing the setting selection unit 107 of the system server 100 to select an operation setting. When "help" is input as a reply, the bot control unit 103 of the system server 100 accepts a condition under which the setting selection unit 107 selects an operation setting through a chat. Here, the amount of charge for the operation of the image processing apparatus 200 is accepted as a condition under which an operation setting is selected (hereinafter referred to as "setting selection condition"). Referring to FIG. 6, the bot control unit 103 displays the chat message "OK! What is your budget?" to prompt the user to designate an amount of money. The user provides the reply chat message "XXX yen" to designate an amount of money.

When a setting selection condition (here, an amount of money) is input, the bot control unit 103 sends the setting selection condition to the setting selection unit 107 to make the setting selection unit 107 select an operation setting. The setting selection unit 107 selects an operation setting satisfying the setting selection condition, and notifies the bot control unit 103 of the operation setting. The bot control unit 103 displays a chat message to notify the user of the selected operation setting received from the setting selection unit 107. The user is able to check the operation setting displayed on the chat board and to determine whether to employ the operation setting. If a plurality of operation settings satisfy the setting selection condition, each of the operation settings is presented to the user to prompt the user to determine whether to employ the operation setting. In the example illustrated in FIG. 6, the chat message "The settings were modified so as not to exceed xxx yen! Please select any candidate!" and candidate operation settings obtained as selection results are displayed. When the user selects one of the displayed candidate operation settings (or, if one candidate operation setting is displayed, when the user selects the displayed candidate operation setting), the bot control unit 103 of the system server 100 notifies the setting accepting unit 105 of the selected candidate operation setting. The setting accepting unit 105 causes the setting management unit 106 to manage the content of the selected operation setting, and then the setting operation is finished.

The "cancel" option is a command to reject the operation request for the image processing apparatus 200. When "cancel" is input as a reply, the bot control unit 103 of the system server 100 rejects the operation request and finishes the operation. For example, if none of the options is selected, the bot control unit 103 may determine that cancellation will be made after the elapse of a certain time, reject the operation request, and finish the operation. After "help" is entered and candidate operation settings are displayed, if none of the candidate operation settings is selected, the bot control unit 103 may also determine that cancellation will be made after the elapse of a certain time, reject the operation request, and finish the operation. Although not illustrated in FIG. 6, when "help" is entered and candidate operation settings are displayed, the "cancel" option may be made available so that the user can intentionally reject the operation request and finish the operation.

The specific phrases in the chat messages displayed by the bot in the chat session on the interactive interface described above with reference to FIG. 6 are not limited to the phrases described above (the phrases illustrated in FIG. 6). Each chat message may prompt the user to input information or perform an operation necessary for each operation phase, or request the user to check information. In addition, phrases presented as reply options in the reset phase may indicate the requirements for the corresponding operation phase, and are not limited to the phrases described above (the phrases illustrated in FIG. 6). While the amount of charge for the operation performed by the image processing apparatus 200 is used as the setting selection condition, a setting for the operation performed by the image processing apparatus 200, such as the size and number of sheets, may be used as the setting selection condition.

Figure 7:
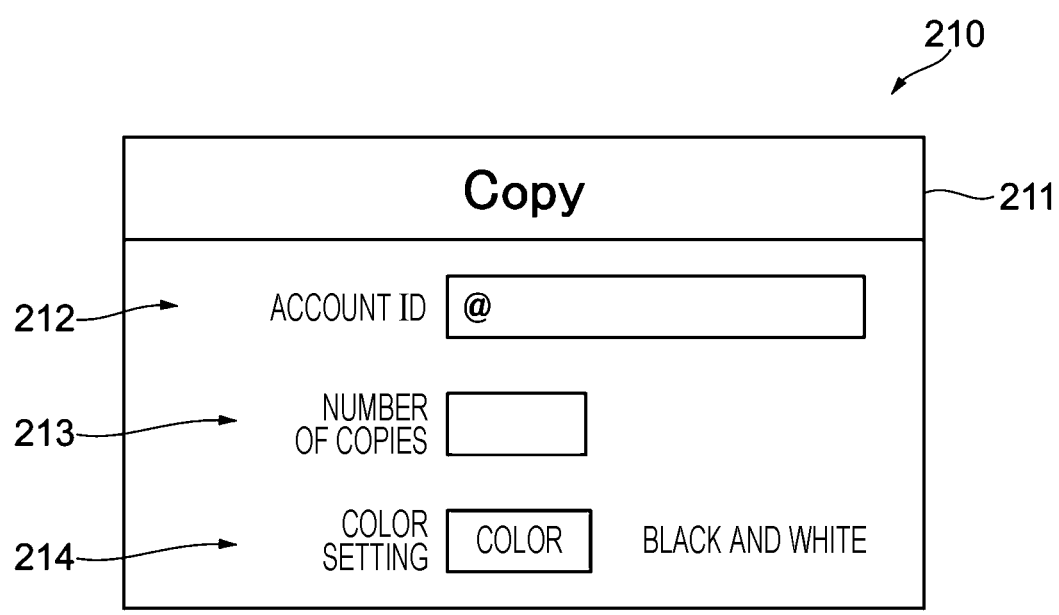
FIG. 7 illustrates an example of a setting screen.

FIG. 7 illustrates an example of the setting screen. When the user performs an operation setting in the setting phase or the reset phase, a setting screen 210 illustrated in FIG. 7, which is generated by the UI screen control unit 104, is displayed on the UI unit 302 of the terminal apparatus 300. The setting screen 210 contains a title field 211, an ID input field 212, a number-of-copies input field 213, and a color setting field 214.

The title field 211 shows a type of operation to be executed. In the illustrated example, "copy" is presented, which indicates a display example for executing a copying operation. The ID input field 212 shows a text box for accepting input of the ID of the user (in FIG. 7, labeled "account ID"). The number-of-copies input field 213 shows a text box for accepting input of the number of copies to be output in the copying operation. The color setting field 214 shows an object that accepts selection of color printing or black and white printing.

The configuration of the setting screen is not limited to the illustrated one. The setting screen may also contain fields for accepting the setting operation for a variety of parameters that can be set in the copying operation, other than the illustrated parameters. While a setting screen for a copying operation is illustrated in FIG. 7, setting screens for a variety of operations (e.g., a printing operation) executable by the image processing apparatus 200 are prepared. A setting screen is displayed that corresponds to the operation that the user desires to cause the image processing apparatus 200 to execute.

Figure 8:
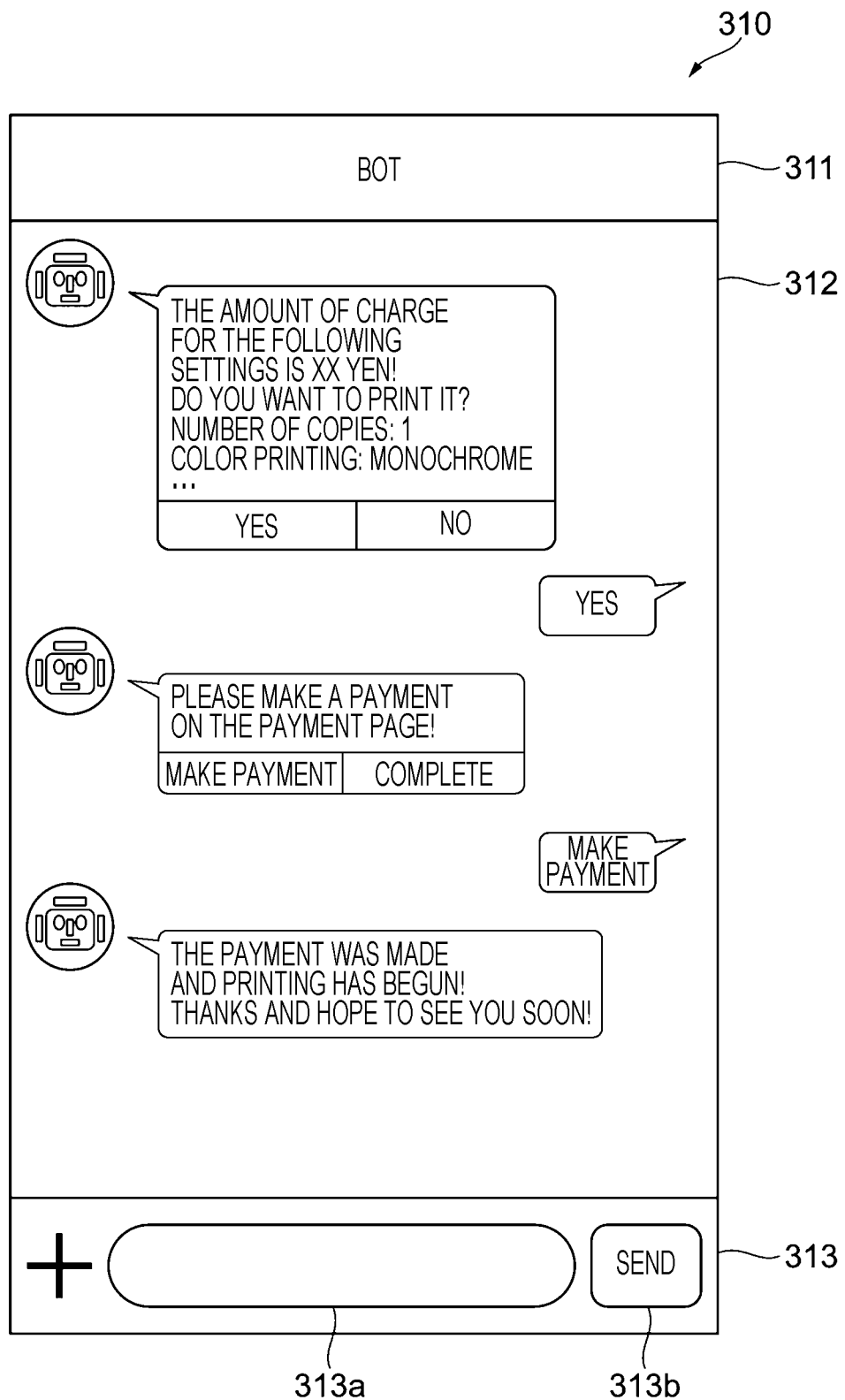
FIG. 8 illustrates another example of the chat board.

FIG. 8 illustrates another example of the chat board displayed on the UI unit 302 of the terminal apparatus 300. A chat board 310 illustrated in FIG. 8 indicates a display example for a payment operation. In the example operation described with reference to FIG. 5, the image processing apparatus 200 executes an operation immediately after the input of a reply chat message that is a command for giving an instruction to execute the operation in the execution instruction accepting phase. In contrast, a payment operation may be performed when a chat message is input as a reply to a command for giving an instruction to execute the operation in the execution instruction accepting phase, and the image processing apparatus 200 may execute an operation after the payment is made.

In an example shown in the conversation display field 312 illustrated in FIG. 8, in response to the chat message "The amount of charge for the following settings is XX yen! Do you want to print it?", which is provided by the bot control unit 103 in the execution instruction accepting phase, the user returns the chat message "Yes". Thereafter, the bot control unit 103 enters a payment phase. Then, the bot control unit 103 instructs the execution instruction acquisition unit 112 to cause the image processing apparatus 200 to execute an operation after the payment is made, and also displays the chat message "Please go to the payment page and make a payment!" to prompt the user to perform a payment operation. The chat message contains reply options. The user selects one of "make payment" and "complete" options as a reply chat message. The "make payment" option is a command for invoking a payment screen generated by the UI screen control unit 104 of the system server 100 and displaying the payment screen on the UI unit 302 of the terminal apparatus 300. When "make payment" is input as a reply, the bot control unit 103 of the system server 100 notifies the payment accepting unit 108 of a request for the payment screen. Then, the payment accepting unit 108 transmits the payment screen generated by the UI screen control unit 104 to the terminal apparatus 300 to display the payment screen on the UI unit 302.

When the user inputs information on the payment screen displayed on the UI unit 302 of the terminal apparatus 300, the bot control unit 103 sends the input payment information to the payment accepting unit 108. The payment accepting unit 108 sends the accepted payment information to the payment processing unit 109 to execute a payment operation. The payment processing unit 109 transmits the payment information to the payment server 600 to ask the payment server 600 to perform a payment operation, and receives a payment result. Upon receipt of the payment result, the payment processing unit 109 informs the bot control unit 103 and the execution instruction acquisition unit 112 that the payment operation is complete. Upon receipt of the notification from the bot control unit 103, the execution instruction acquisition unit 112, which is waiting for the payment to be made, causes the job control unit 113 to control the image processing apparatus 200 to execute an operation. Further, the bot control unit 103 displays the chat message "The payment was made and printing has begun! Thanks and hope to see you soon!" on the chat board 310 to notify the user that the operation of the image processing apparatus 200 is executed. Although the payment screen is not illustrated, an operation screen having an existing electronic payment function may be used.

The specific phrases in the chat messages displayed by the bot in the chat session on the interactive interface described above with reference to FIG. 8 are not limited to the phrases described above (the phrases illustrated in FIG. 8). Each chat message may prompt the user to input information or perform an operation necessary for each operation phase, or request the user to check information. In addition, phrases presented as reply options in the reset phase and the payment phase may indicate the requirements for the respective operation phases, and are not limited to the phrases described above (the phrases illustrated in FIG. 8).

Operation of System Server and Image Processing Apparatus

Figure 9:
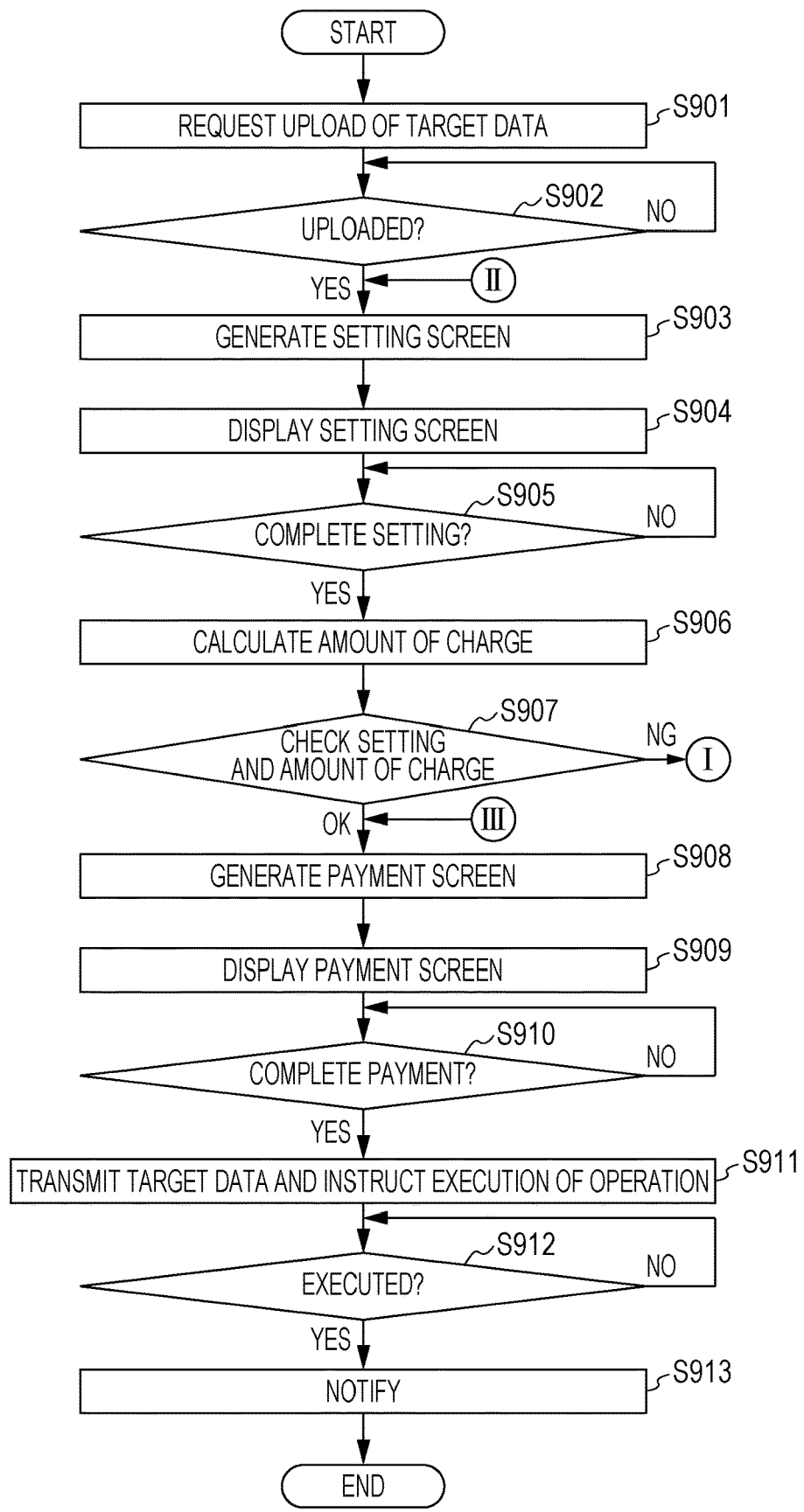
FIG. 9 is a flowchart illustrating an example of the operation of a system server for performing a printing operation.
Figure 10:
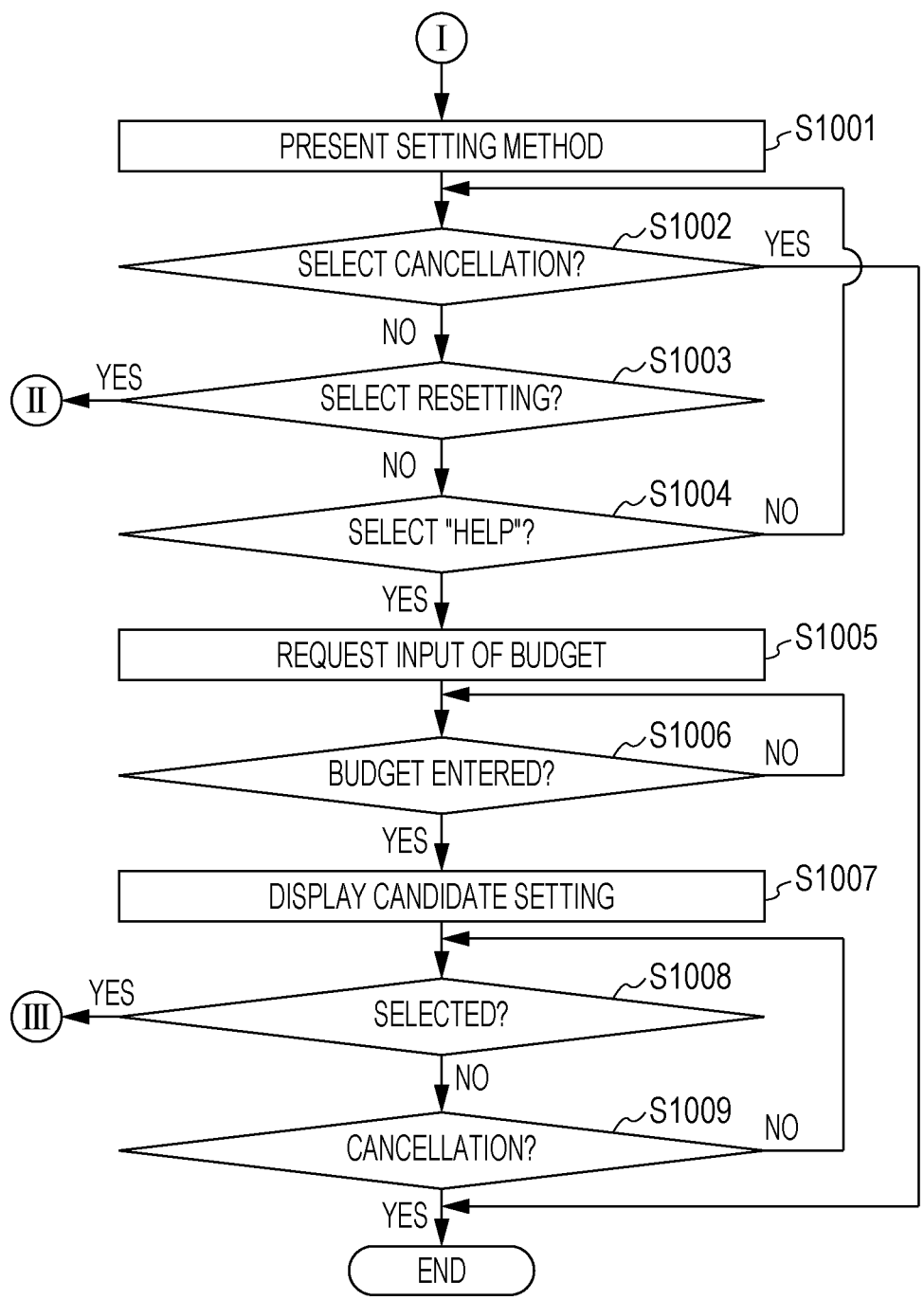
FIG. 10 is a flowchart illustrating the example of the operation of the system server for performing the printing operation.

FIGS. 9 and 10 are a flowchart illustrating an example of the operation of the system server 100 for performing a printing operation. Here, the user is prompted to, instead of identifying target data to be printed (hereinafter referred to as target data) illustrated in FIG. 5, upload the target data in the operation start phase. The target data is uploaded to the data server 500, which is used for the data transfer function of the chat service. In the example operation, furthermore, a payment operation is performed when an execution instruction is made to instruct the image processing apparatus 200 to execute an operation.

First, the bot control unit 103 of the system server 100 requests the user to upload the target data through a chat (S901 in FIG. 9). When the target data is uploaded to the data server 500 (S902), then, the UI screen control unit 104 of the system server 100 generates a setting screen (S903) in response to receipt of a command in the setting phase, and the setting accepting unit 105 causes the terminal apparatus 300 to display the setting screen (S904).

When an operation setting is completed on the setting screen (S905), then, the bot control unit 103 enters the execution instruction accepting phase. Then, the bot control unit 103 calculates the amount of charge for the operation of the image processing apparatus 200 (S906), and presents the operation setting and the amount of charge through the chat. The user checks the presented operation setting and the presented amount of charge, and inputs a chat message indicating an execution instruction when executing the operation. When the bot control unit 103 accepts input of the chat message indicating the execution instruction after checking the operation setting and the amount of charge (OK in S907), then, the UI screen control unit 104 of the system server 100 generates a payment screen (S908) in response to receipt of a command in the payment phase, and the payment accepting unit 108 causes the terminal apparatus 300 to display the payment screen (S909).

When the payment operation is completed (S910), the output data acquisition unit 110 of the system server 100 acquires the target data from the data server 500 and holds the target data in the output data holding unit 111. Then, the execution instruction acquisition unit 112 transmits the target data held in the output data holding unit 111 to the image processing apparatus 200 and instructs the image processing apparatus 200 to execute an operation (S911). When the operation of the image processing apparatus 200 is executed (S912), the bot control unit 103 notifies the user that the operation is executed through the chat (S913).

If the user reviews the operation setting as a result of checking the presented operation setting and the presented amount of charge, the user inputs a chat message indicating an instruction to stop the operation. If the bot control unit 103 accepts input of the chat message indicating the stop instruction after the operation setting and the amount of charge are checked (NG in S907), then, the bot control unit 103 enters the reset phase, and presents a setting method (S1001 in FIG. 10). Here, as in the example illustrated in FIG. 6, the user is able to select any one of resetting by themselves, "help" setting based on selection by the setting selection unit 107, and cancellation. In this example operation, the amount of charge (budget) for the operation of the image processing apparatus 200 is set as an example setting selection condition for the "help" setting.

If the user selects cancellation (YES in S1002), the bot control unit 103 rejects the operation request and finishes the operation. If the user selects resetting (NO in S1002 and YES in S1003), the operation returns to S903, and a setting screen is generated. The setting accepting unit 105 accepts settings set by the user. If the user selects "help" (NO in S1002, NO in S1003, and YES in S1004), the bot control unit 103 requests input of a budget for the operation of the image processing apparatus 200 through the chat (S1005). When the user inputs a budget (S1006), the setting selection unit 107 selects an operation setting of the image processing apparatus 200 executable within the input budget, and displays a candidate of the selected operation setting (hereinafter referred to as "candidate setting") on the chat board (S1007). If there is a plurality of candidate settings with which the operation of the image processing apparatus 200 is executable within the input budget, all the candidate settings are displayed to accept selection of one candidate setting by the user.

If one of the displayed candidate settings is selected (YES in S1008), the operation proceeds to S908, and a transition to the payment phase occurs. If the user selects cancellation (NO in S1008 and YES in S1009), the bot control unit 103 rejects the operation request and finishes the operation. If the user does not select any of the candidate settings or select cancellation (NO in S1008 and NO in S1009), the bot control unit 103 determines that cancellation will be made after the elapse of a certain time, rejects the operation request, and finishes the operation. If the user selects none of resetting, "help" setting, and cancellation after the setting method is presented in S1001 (NO in S1002, NO in S1003, and NO in S1004), the bot control unit 103 also determines that cancellation will be made after the elapse of a certain time, rejects the operation request, and finishes the operation.

Figure 11:
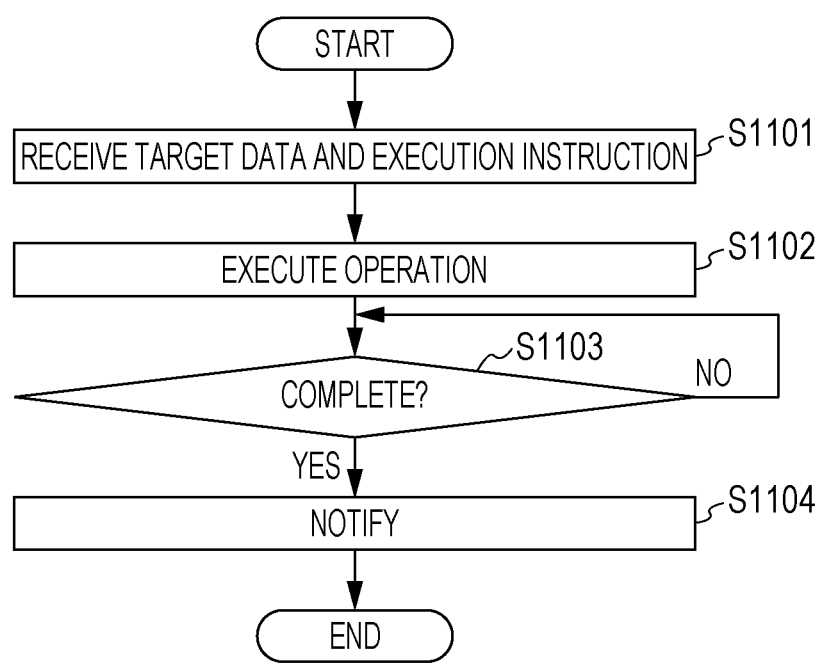
FIG. 11 is a flowchart illustrating an example of the operation of the image processing apparatus for performing the printing operation.

FIG. 11 is a flowchart illustrating an example of the operation of the image processing apparatus 200 for performing a printing operation. Upon receipt of target data and an execution instruction for executing a printing operation (S1101), the image processing apparatus 200 executes an operation in accordance with the received execution instruction (S1102). When the operation is completed (S1103), the image processing apparatus 200 notifies the system server 100 of the completion of the operation (S1104).

In the foregoing example operation, after the payment is made, the system server 100 acquires the target data uploaded to the data server 500 and transmits the target data to the image processing apparatus 200 together with an execution instruction for executing an operation. Any method other than that in the example described above may be used to transfer the target data. For example, the system server 100 may acquire the target data at the time when the operation setting and the amount of charge are checked (see S907 in FIG. 9) or any other suitable timing. Alternatively, the system server 100 may ask the chat server 400 to transmit the target data from the data server 500 directly to the image processing apparatus 200, or instruct the image processing apparatus 200 to acquire the target data from the data server 500.

Figure 12:
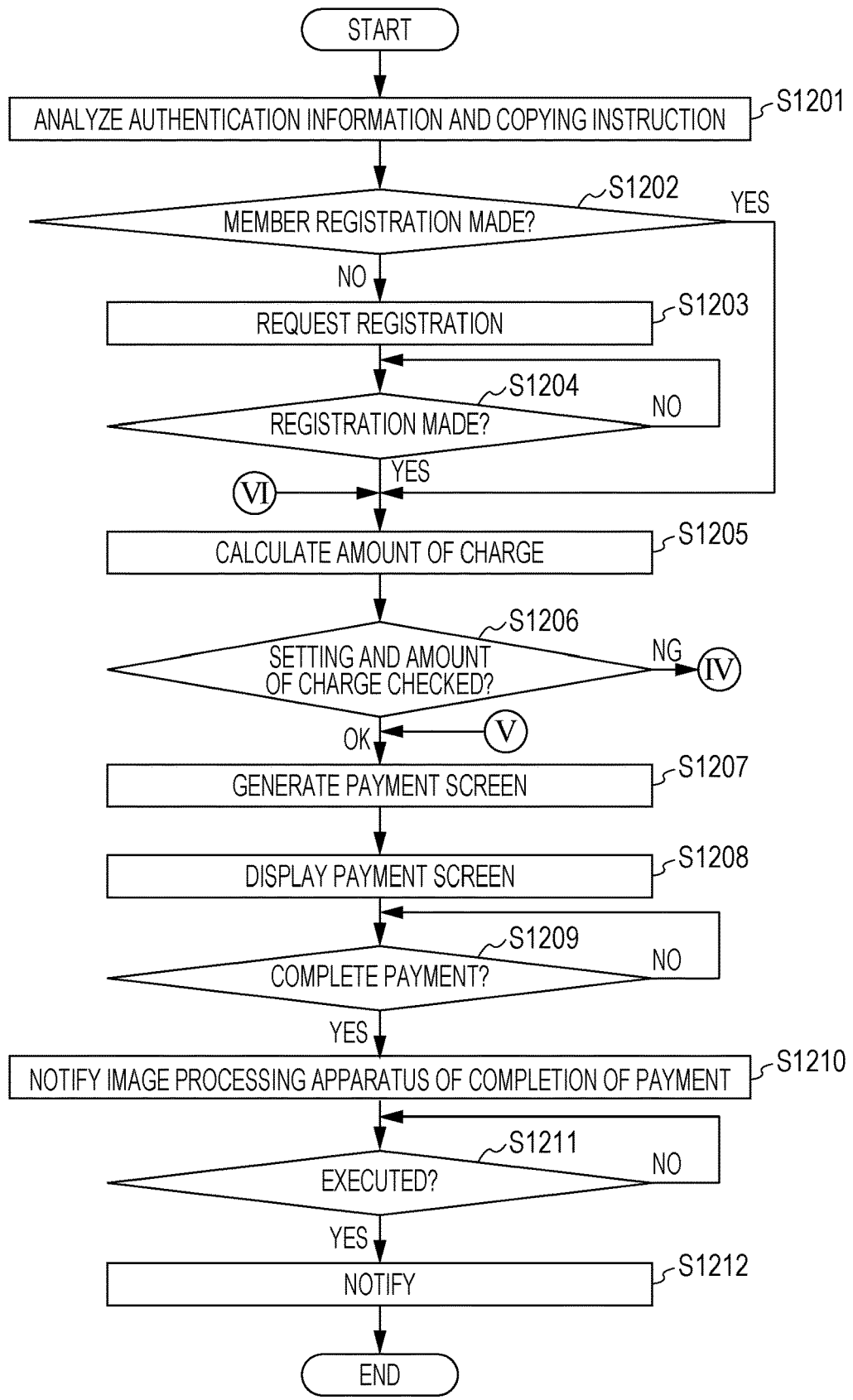
FIG. 12 is a flowchart illustrating an example of the operation of the system server for performing a copying operation.
Figure 13:
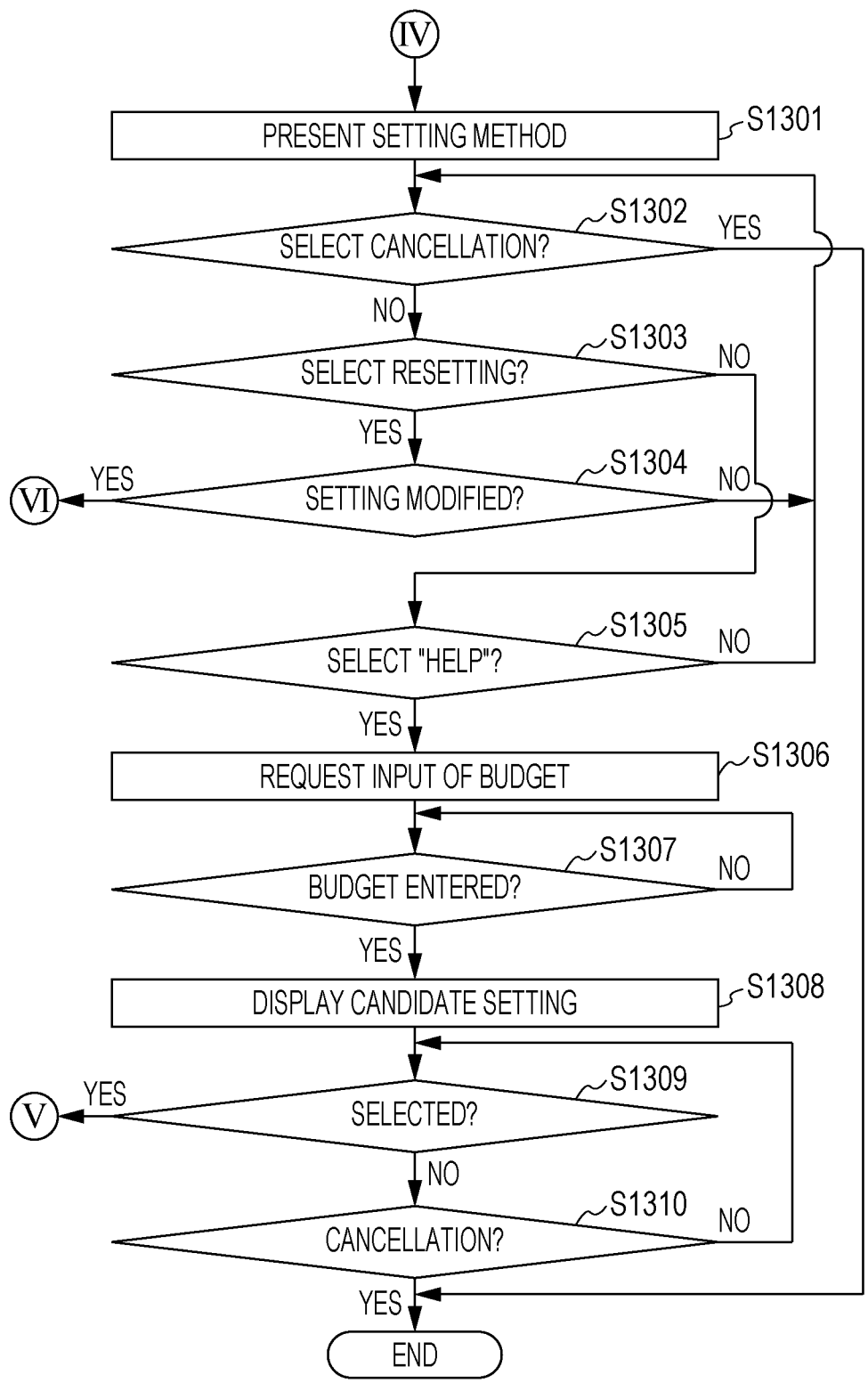
FIG. 13 is a flowchart illustrating the example of the operation of the system server for performing the copying operation.

FIGS. 12 and 13 are a flowchart illustrating an example of the operation of the system server 100 for performing a copying operation. In the copying operation, a user's operation is initially performed on the image processing apparatus 200 to set a document on the image processing apparatus 200. Specifically, an operation is executed on the image processing apparatus 200 to authenticate the user and provide an instruction to copy the document (hereinafter referred to as "copying instruction").

First, when authentication information and a copying instruction are input to the image processing apparatus 200 to use the image processing apparatus 200, the authentication information and the copying instruction are transmitted from the image processing apparatus 200 to the system server 100. Then, the authentication unit 102 of the system server 100 analyzes the authentication information, and the execution instruction acquisition unit 112 analyzes the copying instruction (S1201 in FIG. 12). If member registration has been made to obtain the right to use the image processing apparatus 200 (YES in S1202), the bot control unit 103 of the system server 100 enters the execution instruction accepting phase. Then, the bot control unit 103 calculates the amount of charge for the operation of the image processing apparatus 200 (S1205), and presents an operation setting and the amount of charge through a chat. The presented operation setting includes actual settings set in the image processing apparatus 200. If member registration has not been made (NO in S1202), the bot control unit 103 requests the user to perform member registration through the chat (S1203). After member registration is made (S1204), the bot control unit 103 calculates the amount of charge for the operation of the image processing apparatus 200 (S1205), and presents the operation setting and the amount of charge through the chat.

The user checks the presented operation setting and the presented amount of charge, and inputs a chat message indicating an execution instruction when executing the operation. When the bot control unit 103 accepts input of the chat message indicating the execution instruction after the operation setting and the amount of charge are checked (OK in S1206), then, the UI screen control unit 104 of the system server 100 generates a payment screen (S1207) in response to receipt of a command in the payment phase, and the payment accepting unit 108 causes the terminal apparatus 300 to display the payment screen (S1208).

When the payment operation is completed (S1209), the payment accepting unit 108 of the system server 100 notifies the image processing apparatus 200 that the payment is made (S1210). When the operation of the image processing apparatus 200 is executed (S1211), the bot control unit 103 notifies the user that the operation is executed through the chat (S1212).

If the user reviews the operation setting as a result of checking the presented operation setting and the presented amount of charge, the user inputs a chat message indicating an instruction to stop the operation. If the bot control unit 103 accepts input of the chat message indicating the stop instruction after the operation setting and the amount of charge are checked (NG in S1206), then, the bot control unit 103 enters the reset phase, and presents a setting method (S1301 in FIG. 13). Here, as in the example illustrated in FIG. 6, the user is able to select any one of resetting by themselves, "help" setting based on selection by the setting selection unit 107, and cancellation. In this example operation, the amount of charge (budget) for the operation of the image processing apparatus 200 is set as a setting selection condition for the "help" setting.

If the user selects cancellation (YES in S1302), the bot control unit 103 rejects the operation request and finishes the operation. If the user selects resetting (NO in S1302 and YES in S1303), the operation phase of the image processing apparatus 200 is changed to the setting phase so that a change in the settings can be accepted. After a setting is modified (S1304), the operation returns to S1205. Then, the amount of charge is re-calculated, and the operation setting and the amount of charge are checked again.

If the user selects "help" (NO in S1302, NO in S1303, and YES in S1305), the bot control unit 103 requests input of a budget for the operation of the image processing apparatus 200 through the chat (S1306). When the user inputs a budget (S1307), the setting selection unit 107 selects an operation setting of the image processing apparatus 200 executable within the input budget, and displays a candidate of the selected operation setting (hereinafter referred to as "candidate setting") on the chat board (S1308). If there is a plurality of candidate settings with which the operation of the image processing apparatus 200 is executable within the input budget, all the candidate settings are displayed to accept selection of one candidate setting by the user.

If one of the displayed candidate settings is selected (YES in S1309), the operation proceeds to S1207, and a transition to the payment phase occurs. If the user selects cancellation (NO in S1309 and YES in S1310), the bot control unit 103 rejects the operation request and finishes the operation. If the user does not select any of the candidate settings or select cancellation (NO in S1309 and NO in S1310), the bot control unit 103 determines that cancellation will be made after the elapse of a certain time, rejects the operation request, and finishes the operation. If the user selects none of resetting, "help" setting, and cancellation after the setting method is presented in S1301 (NO in S1302, NO in S1303, and NO in S1305), the bot control unit 103 also determines that cancellation will be made after the elapse of a certain time, rejects the operation request, and finishes the operation.

Figure 14:
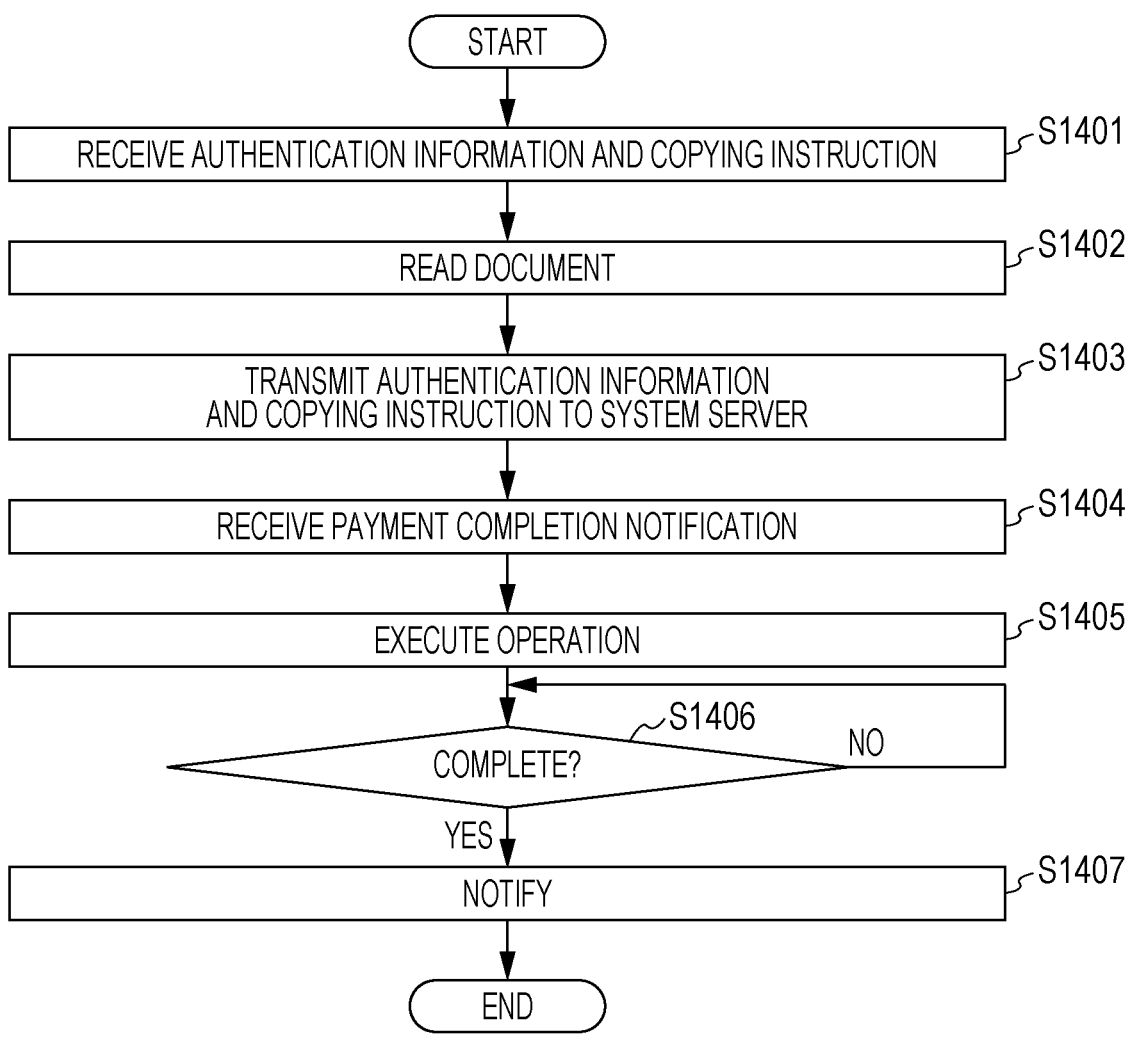
FIG. 14 is a flowchart illustrating an example of the operation of the image processing apparatus for performing the copying operation.

FIG. 14 is a flowchart illustrating an example of the operation of the image processing apparatus 200 for performing a copying operation. The image processing apparatus 200 performs user authentication and receives input of authentication information. Also, the image processing apparatus 200 accepts a copying instruction through the operation of the UI unit 207 (S1401), and reads a document to be copied (S1402). Then, the image processing apparatus 200 transmits the authentication information and the copying instruction to the system server 100 (S1403). As described above, the system server 100 executes a payment operation and the like, and, as in S1210 of FIG. 12, transmits a notification of the completion of payment to the image processing apparatus 200.

Upon receipt of the notification of the completion of payment (S1404), the image processing apparatus 200 executes a copying operation (S1405). When the copying operation is completed (S1406), the image processing apparatus 200 notifies the system server 100 of the completion of the copying operation (S1407). As in S1211 and S1212 of FIG. 12, the system server 100 receives the completion notification and notifies the user of the completion of the copying operation.

In the example operation described above, the user selects an operation setting from candidate settings satisfying a setting selection condition input for the "help" setting (in the example operation described above, the amount of charge (budget) for the operation of the image processing apparatus 200). If there is a plurality of candidate settings with which the operation of the image processing apparatus 200 is executable under the input setting selection condition (budget), all the candidate settings are displayed to accept selection of one candidate setting by the user. Alternatively, if there is a plurality of candidate settings with which the operation of the image processing apparatus 200 is executable under the input setting selection condition (budget), a specific setting may be presented as a candidate setting in accordance with a predetermined condition. For example, an operation setting of the image processing apparatus 200 executed at the lowest cost, specific examples of which include simplex printing and formation of monochrome images, may be presented as a candidate setting. Alternatively, an operation setting of the image processing apparatus 200 executed at a cost less than or equal to the upper limit of the input budget and closest to the upper limit of the budget may be presented as a candidate setting. Alternatively, an operation setting set on the initial setting screen in the printing operation (S905 in FIG. 9) or settings closest to the settings set in the image processing apparatus 200 in the copying operation may be presented as candidate settings. Alternatively, priority may be placed on a plurality of candidate settings with which the operation of the image processing apparatus 200 is executable under the input setting selection condition (budget) in order from closest to farthest away from a specific condition, and the candidate settings may be presented in order based on the priority or may be presented with chat messages or the like indicating recommendation in order of priority (i.e., from highest to lowest priority).

In addition, consideration is given of a case where there is no candidate setting meeting the setting selection condition. In this case, no candidate setting is presented, and thus the bot control unit 103 may display a chat message indicating that there is no candidate setting meeting the setting selection condition. Alternatively, another chat message may be displayed that prompts the user to change the setting selection condition, and a candidate setting may be selected again in accordance with the changed setting selection condition. Furthermore, the setting selection unit 107 of the system server 100 may change a portion of a setting selection condition designated by the user so that a candidate setting can be selected, and the bot control unit 103 may present a proposed change in the setting selection condition through a chat.

While an exemplary embodiment of the present disclosure has been described, the technical scope of the present disclosure is not limited to the exemplary embodiment described above. Various modifications and structural replacements may be made to the present disclosure without departing from the spirit of the technical idea, and such modifications and replacements are included in the present disclosure.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing service system comprising:
a processor programmed to:
accept an operation request for an image processing apparatus through a chat between a user and a chatbot serving as a participant in a chat service on a chat board provided by the chat service;
accept a setting for an operation of the image processing apparatus requested by the operation request;
make a payment for the operation of the image processing apparatus requested by the operation request through an electronic payment system available on the chat service; and
control the image processing apparatus to execute the operation requested by the operation request after the setting is accepted by the processor and the payment is made by the processor;
calculate an amount of charge for the operation executed by the image processing apparatus using the setting accepted by the processor, and present the calculated amount of charge through the chat on the chat board;
make a payment of the amount of charge presented by the processor, the amount of charge being approved by the user;
select a setting for the operation of the image processing apparatus executable with a specified amount of money;
accept input of an amount of money from the user on the chat board, and present a setting selected by the processor based on the accepted amount of money when the amount of charge presented by the processor is not approved by the user; and
in response to the setting presented by the processor being approved by the user, the processor controls the image processing apparatus to execute the operation requested by the operation request using the approved setting.

2. The image processing service system according to claim 1, wherein the processor is further programmed to:
when a plurality of settings are selected by the processor based on the accepted amount of money, present the plurality of settings and accept a setting selected by the user among the plurality of settings on the chat board; and
control the image processing apparatus to execute the operation requested by the operation request using the setting selected by the user among the plurality of settings presented by the processor.

3. The image processing service system according to claim 1, wherein the processor is further programmed to:
in response to absence of a setting with which the operation of the image processing apparatus is executable under the accepted condition, identify a proposed change in the condition to select a setting with which the operation of the image processing apparatus is executable under the changed condition; and
present the proposed change in the condition identified by the processor.

4. The image processing service system according to claim 1, wherein the processor is further programmed to:
generate a screen for accepting an operation performed by the user; and
present a command for displaying the screen generated by the processor on the chat board.

5. The image processing service system according to claim 4, wherein the processor is further programmed to:
accept a setting for the operation of the image processing apparatus by accepting an operation performed on a setting screen, the setting screen being generated by the processor and invoked from the chat board using the command.

6. The image processing service system according to claim 4, wherein the processor is further programmed to:

make a payment for the operation of the image processing apparatus by accepting an operation performed on a payment screen, the payment screen being generated by the processor and invoked from the chat board using the command.

7. The image processing service system according to claim 1, wherein the processor is further programmed to:
acquire target data by using a data transfer function provided in the chat service; and
control the image processing apparatus to execute the operation requested by the operation request on the target data acquired by the processor.

8. An image processing service system comprising:
operation request accepting means for accepting an operation request for an image processing apparatus through a chat between a user and a chatbot serving as a participant in a chat service on a chat board provided by the chat service;
setting accepting means for accepting a setting for an operation of the image processing apparatus requested by the operation request;
payment control means for making a payment for the operation of the image processing apparatus requested by the operation request through an electronic payment system available on the chat service; and
operation execution control means for controlling the image processing apparatus to execute the operation requested by the operation request after the setting is accepted by the setting accepting means and the payment is made by the payment control means;
a charge presenting means that calculates an amount of charge for the operation executed by the image processing apparatus using the setting accepted by the setting accepting means, and presents the calculated amount of charge through the chat on the chat board, wherein
the payment control means makes a payment of the amount of charge presented by the charge presenting means, the amount of charge being approved by the user;
a setting selection means that selects a setting for the operation of the image processing apparatus executable with a specified amount of money; and
a setting presenting means that accepts input of an amount of money from the user on the chat board, and presents a setting selected by the setting selection means based on the accepted amount of money when the amount of charge presented by the charge presenting means is not approved by the user, wherein
in response to the setting presented by the setting presenting means being approved by the user, the operation execution control means controls the image processing apparatus to execute the operation requested by the operation request using the approved setting.

* * * * *